United States Patent [19]

Smith et al.

[11] Patent Number: 4,551,481

[45] Date of Patent: Nov. 5, 1985

[54] FLOOR CLEANING COMPOSITION

[75] Inventors: James A. Smith, Old Tappan; Betty J. Murphy, Upper Montclair, both of N.J.

[73] Assignee: Creative Products Resource Associates, Ltd., Clifton, N.J.

[21] Appl. No.: 716,937

[22] Filed: Mar. 28, 1985

Related U.S. Application Data

[60] Division of Ser. No. 684,384, Dec. 20, 1984, , which is a continuation-in-part of Ser. No. 511,185, Jul. 6, 1983, , and a continuation-in-part of Ser. No. 660,350, Oct. 12, 1984, abandoned.

[51] Int. Cl.$^4$ .............................................. C08J 9/38
[52] U.S. Cl. ........................................ 521/52; 134/40; 252/90; 252/91; 252/174; 252/DIG. 2; 521/76; 521/110; 521/111; 521/122; 521/123; 521/159; 521/905; 521/918
[58] Field of Search ................... 521/52, 76, 110, 111, 521/122, 123, 159, 905, 918; 252/90, 91, 174

[56] References Cited

U.S. PATENT DOCUMENTS

| | | | |
|---|---|---|---|
| 3,088,158 | 5/1963 | Boyle et al. | 15/506 |
| 3,242,109 | 3/1966 | Showalter | 521/122 |
| 3,533,953 | 10/1970 | Mills et al. | 252/88 |
| 3,598,772 | 8/1971 | Hood et al. | 521/170 |
| 3,810,841 | 5/1974 | Richter | 252/91 |
| 3,833,386 | 9/1975 | Wood et al. | 106/41 |
| 3,861,993 | 1/1975 | Guthrie | 161/159 |
| 3,888,766 | 6/1975 | De Young | 521/905 |
| 3,890,254 | 6/1975 | Guthrie | 521/159 |
| 4,059,666 | 11/1977 | Fowler | 264/129 |
| 4,066,394 | 1/1978 | Leonard | 8/137 |
| 4,066,578 | 1/1978 | Murch et al. | 521/123 |
| 4,127,515 | 4/1978 | MacRae et al. | 521/111 |
| 4,137,200 | 1/1979 | Wood et al. | 521/159 |
| 4,160,076 | 7/1979 | Guthrie et al. | 521/159 |
| 4,271,272 | 6/1981 | Strickman et al. | 521/905 |
| 4,309,509 | 1/1982 | Wood | 521/132 |
| 4,343,910 | 4/1980 | Bush, Jr. et al. | 522/82 |
| 4,421,526 | 12/1983 | Strickman et al. | 51/296 |

*Primary Examiner*—Morton Foelak
*Attorney, Agent, or Firm*—Merchant, Gould, Smith, Edell, Welter & Schmidt

[57] ABSTRACT

An absorbent floor cleaning composition is disclosed comprising shreds of a hydrophilic, open-celled, solids-loaded polyurethane foam having an aqueous phase releasably absorbed therein. The composition is particularly effective to clean flooring fouled with oily or greasy soils.

11 Claims, No Drawings

FLOOR CLEANING COMPOSITION

CROSS REFERENCE TO RELATED APPLICATIONS

This is a division of application Ser. No. 684,384, filed Dec. 20, 1984, which is a continuation-in-part of U.S. application Ser. No. 511,185, filed July 6, 1983, and a continuation-in-part of U.S. application Ser. No. 660,350, filed Oct. 12, 1984 abandoned.

BACKGROUND OF THE INVENTION

The work areas of food service, storage or processing facilities present difficult cleaning problems, since surfaces such as floors, counters, steps and the like rapidly become fouled with greasy or oily soils. These soils can create both health and safety hazards in areas in which large amounts of cooking oil, lard, butter, fish oil, tallow, and the like are employed. To facilitate cleaning, the floors of restaurant and institutional kitchens, canning factories, dairy and meat processing plants and the like are commonly formed from hard, non-porous materials such as glazed tile, plastics and stainless steel which are cleaned by the application of aqueous detergent systems. However, such cleaning compositions often must be diluted or solubilized prior to use and present additional problems in application and clean-up in areas which contain equipment or other materials which are not water-resistant.

Commonly-assigned application Ser. No. 511,185, filed July 6, 1983, is directed to a cleaning composition formed by shredding a friable, hydrophilic, open-celled, solids-loaded polyurethane foam. These shreds are useful to absorb liquid oil spills from porous surfaces such as concrete, brick and the like. However, a need exists for a floor cleaning composition which will clean food processing work areas fouled with residues of greasy and/or oily soil which may be primarily solid, waxy or pastey in nature.

BRIEF DESCRIPTION OF THE INVENTION

The present invention is directed to a solid cleaning composition which is effective in loosening, dispersing, and picking up deposits of greasy and oily soil. The composition comprises hydrophilic, open-celled polyurethane foam shreds which incorporate an aqueous phase and abrasive particles coupled within the cell walls. This interior aqueous phase can also incorporate surfactants and grease-cutting solvents.

The foam shreds function as carrier particles for a second aqueous phase which promotes the release of the surfactants and solvents and promotes the even application of the shreds to the soiled flooring. Since this carried aqueous phase is post-added to the foam shreds it may be referred to as the "exterior aqueous phase" is opposed to the interior aqueous phase which is integrally incorporated into the foam matrix.

When brushed or swept over a soiled surface, the foam shreds scour the surface and deposit a coating of an aqueous cleaning mixture thereon which breaks up the grease or oil, which becomes adhered to the foam matrix. The shreds retain their structural integrity during the cleaning process and can be easily swept up or otherwise removed from the floor without clumping or sticking.

The foam carrier shreds useful in the present compositions are prepared by foaming a polyurethane prepolymer resin which contains at least two free isocyanate groups per resin molecule with an aqueous reactant phase comprising a slurry of solid abrasive particles. The solid particles will also have been pretreated with a silane-coupling agent which functions to bind the particles into the polyurethane foam matrix. Although polyurethane foams useful in the present invention may be foamed from aqueous slurries which comprise up to about 80% by weight of the silane-treated particles, an amount of abrasive equal to about 40-70% of the total slurry weight is preferred, since this range of particles resists separation from the polymeric matrix when the foam shreds are spread over the floor and removed, while imparting effective scouring power to the cleaning composition. The aqueous slurry of abrasive particles is combined with the prepolymer resin so that the final mole ratio of water to the total free isocyanate groups on the prepolymer molecules is within the range of about 5–100:1. These amounts of water react with the free isocyanate groups to release carbon dioxide which blows the prepolymer into a cross-linked, open-celled foam which is rendered hydrophilic by entrapment of excess water in the cell walls of the foam matrix. When the prepolymer-slurry mixture is allowed to set in molds, a dense, friable foam bun is formed which is easily shredded or chopped into foam particles of the desired size. As used herein, the term "bun" is intended to include any of the foamed bodies which may be shredded to yield the present product, such as films, slab stock, and the like.

The cleaning activity of the present compositions is enhanced by incorporating an effective amount of one or more detergents or surfactants and an organic solvent in the aqueous phase used to form the foams. The water in excess of that required to foam the resin is entrapped within the cell walls of the foam. The substantially integral incorporation of the interior aqueous phase into the foam matrix leaves the open cellular voids largely clear and available to absorb the exterior aqueous phase, which can comprise about 5–50% of the weight of the foam. The exterior aqueous phase water, along with the surfactant and the solvent, is partially released when the foam shreds are contacted with the soiled surface under conditions of pressure, such as by sweeping or otherwise rubbing the shreds over the floor. The surfactant can act both to disperse the organic solvent in the exterior aqueous phase as well as to allow the aqueous phase to wet the oily flooring. The surfactant then can function to disperse the oil or grease, which is then absorbed by the foam shreds. The organic solvents also help to dissolve and remove the soil. Upon pickup of the shreds, a wet, substantially grease-free film remains on the floor, which rapidly dries.

DETAILED DESCRIPTION OF THE INVENTION

The floor cleaning composition of the present invention is prepared by a process comprising forming an aqueous slurry which includes solid abrasive particles which have been treated with a silane-coupling agent. The slurry further includes an amount of surfactant effective to form an open-celled foam upon reaction of the aqueous phase with a water-foamable polyurethane prepolymer resin. The surfactant also functions to allow the exterior aqueous phase to wet the soiled flooring and to disperse or dissolve the grease and/or oil film.

The aqueous phase may further comprise a suspending agent and additional foam-forming and structuring agents such as silicone fluids, additional surfactants, organic solvents and the like which also act to build the cleaning power of the finished composition. The fully-formed aqueous slurry is then combined with a water-foamable prepolymer resin and the reaction mixture allowed to foam and cure to form self-cross-linked, open-celled, friable polyurethane bun. The bun is chopped or shredded to form absorbent, highly reticulated shreds which are then employed to absorb the exterior aqueous phase.

Pre-Polymer Resin

The preparation of open-celled, hydrophilic polyurethane foams by the reaction of specially-formulated prepolymer resins with large excesses of water without the need for added catalysts or cross-linking agents is disclosed in U.S. Pat. Nos. 3,890,254; 4,137,200 and 4,160,076. These resins permit the introduction of large amounts of solids into the foam matrices via preformed aqueous slurries of solid particles which are subsequently reacted with the prepolymer resin in order to foam it into the desired product. A preferred class of water-foamable prepolymer resins which yield cross-linked, hydrophilic polyurethane foams upon the addition of water are those belonging to the commercially-available Hypol ® series, available from W. R. Grace & Co. (FHP 3000, 2000, 2000 HD, 2002) and which are generally described in U.S. Pat. No. 4,137,200, the disclosure of which is incorporated by reference herein. These liquid resins are prepared by capping mixtures of polyols having 3-8 hydroxyl groups and polyoxyethylene diols with toluene diisocyanate. The capped alcohol mixtures have an average number of free isocyanate groups per molecule which is equal to two or more, i.e., 2-8.

These resins possess molecular weights within the range of about 1300-1400 and have about 1.5-2.5 mEq./g. of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which cross-link and stabilize the foam, while entrapping a part of the excess water in the cell walls, where it acts to enhance the hydrophilic properties of the foam. The compatibility of the foam matrix with large molar excesses of water is a necessary requirement of resins useful in the practice of the present invention, since large amounts of water are needed to uniformly introduce large amounts of abrasive material into the matrix.

In the practice of the present invention, useful foams may be formed by combining water with prepolymer resin in a weight ratio of water to polymer of 0.5-3.0:1, preferably 0.5-2.75:1. These ranges yield a mole ratio of water to free isocyanate groups of about 5-100:1, preferably about 10-70:1.

Particulate Abrasive

Particulate abrasive solids are employed as components of the present cleaning compositions and are dispersed and bound throughout the foam matrix by silane-coupling agents as described below. The choice of abrasive material may be made from a wide variety of materials of adequate hardness and of a particle size range which will enable them to effectively scour tile, hard plastic or metal surfaces and to loosen dirt or other debris held thereto by the greasy or oily residue. The abrasive solids can comprise about 25-70% by weight of the aqueous reactant phase, preferably about 40-65% and most preferably about 50-65%, but much less abrasive may be used in some compositions while still obtaining a beneficial effect, i.e., as little as 1-5% in the case of certain extremely abrasive materials such as carborundum or zirconium oxides. The weight ratio of abrasive to prepolymer which may be used is limited only by the ability of the foamed polymeric matrix to retain the abrasive particles without undue separation and loss of the solid during preparation, shipping or use. Preferably, the weight of the abrasive used will be from about 50-500% of the prepolymer weight, most preferably 200-350%.

Due to the use of a silane-coupling agent to bind the preferred amounts of abrasive particles to the foam matrix, abrasive particles are preferably chosen from those substances which possess sufficient free surface Si—OH or Al—OH groups to form reactive sites for the silane-coupling agents. Among the substances that meet this requirement are the feldspar minerals, clays, quartz, aluminas, diatomaceous earths, sands, glasses, naturally-occurring and synthetic zeolites, zircon, carborundum, pumice and the like, which may be used singly or in mixtures. The abrasive particles may include materials which can promote the formation of a uniform, stable suspension of the abrasive materials in the aqueous reactant phase. Such materials include natural and synthetic clays such as the montmorillonites, saponites, laponites and hectorites, and the inosilicates such as calcium, sodium or magnesium aluminum silicates.

A preferred abrasive for use in the foams of the present invention is F-4 feldspar (170200 mesh) available from International Minerals and Chemical Corporation, Mundelein, Ill. The silane-treated abrasive solids are preferably introduced into the present cleaning compositions as components of the aqueous reactant phase, in which they are suspended prior to the foaming reaction, as described hereinbelow.

Silane Coupling Agent

The compositions of the present invention will also include a minor but effective amount of a silane-coupling agent which functions to bond to both the polyurethane matrix and the surface of the particles of the inorganic abrasive, tnhus chemically-coupling the abrasive into the polymeric matrix and preventing the abrasive particles from separating from the foam matrix during shredding, packaging or use. Silane-bound solid particles also clump less readily and so are more evenly dispersed throughout the solidifying matrix during the foaming reaction.

Useful silane-coupling agents may be selected from members of organosilicon monomers such as substituted-alkyl(trisalkoxy)silanes which can be characterized by the formula $RSiX_3$, wherein R is an organofunctional group attached to silicon in a hydrolytically stable manner and X designates hydrolyzable groups which are converted to silanol groups upon hydrolysis. Most commonly, R comprises a vinyl, methacryloxypropyl, 3,4-epoxycyclohexylethyl, 3-glycidoxypropyl, 3-mercaptopropropyl, 3-aminopropyl or 3-ureidopropyl moiety which may be further separated from the silicon group by one or two $-NH(CH_2)_n$ moieties wherein n=1-2. Preferably X is an alkoxy group selected from the group consisting of methoxy, ethoxy, 2-methoxyethoxy or is acetoxy. Preferred silane-coupling agents are commercially-available from Union Carbide as the A-series, e.g. A1100-A1160, which include 3-aminopropyltriethoxysilane, 3-aminopropyltrimethoxysilane (also available from Dow Corning as Z-6020), N-2-aminoethyl-3-aminopropyltrimethoxysilane, or 3-ureidopropyl-triethoxysilane.

The silane-coupling agents are reacted with the particulate abrasive by adding the silane to a stirred slurry of the abrasive in the water used to form the aqueous phase. Completion of the hydrolysis reaction is assured by heating the slurry to at least about 70°-90° F. at which point the other components of the aqueous phase, e.g., the suspending agent, surfactants, foam structuring agents, solvents and the like may be added, along with the remainder of the water. When the abrasive solid particles are coated in this fashion, the free amino groups of the coupling agent bind to the polymeric chains of the substrate during the foaming step, i.e., when the aqueous reactant phase and the polyurethane prepolymer are mixed together.

Suspending Agent

In order to promote the uniform dispersion of the abrasive particles in the aqueous reactant phase, an effective amount of an inorganic or organic suspending agent can be added to the aqueous phase.

Preferably, an inorganic suspending agent will be employed, such as one of natural or synthetic mineral origin. Useful suspending agents of this type can also enhance the scouring power of the foam shreds. Such minerals include the preferred inosilicates which can be used alone, or in combination with minor amounts of clay suspending agents. Preferred inosilicates are the naturally-occurring calcium metasilicates such as wollastonite, available as the NYAD ® wollastonite series (Processed Minerals Inc., Willsboro, NY), of which NYAD ®400 is especially preferred. Synthetic sodium magnesium silicate clays and fumed silicas can also be used as suspending agents.

The solid suspending agents can be introduced into the aqueous reactant phase as dry powders at any convenient time during its formation. Preferably they will be added after reaction of the particulate abrasive with the silane coupling agent. The suspending agent will be used in amounts equal to about 1-15%, preferably about 2-10% by weight of the aqueous reactant phase. When added in these amounts the suspending agent will represent about 5-15% of the total weight of the abrasive particles which are employed.

Silicone Fluid

Silicone fluids can also be employed as foam cell initiating and structuring agents and are selected from those which function to control cell size and aid reticulation. There fluids also function to break up films or other deposits of oily or greasy soils. Useful classes of silicone fluids include the linear polydimethylsiloxanes or the tetrameric or pentameric cyclic siloxanes (cyclomethicones) which are available from Rhone-Poulenc, Inc. (Monmouth Junction, NJ) as the Rhodorsil ®200 fluid series in a wide range of viscosities (i.e., 10-10,000 cps.). When used as a component of the present foams, about 0.1-20%, preferably 1-10% by weight of the aqueous phase of a silicone fluid of about 0.5-150 cps viscosity, preferably about 25-100 cps, can be employed.

Surfactants

One or more surfactants will also be incorporated into the aqueous reactant phase. These surfactants function to remove the window membranes of the foam cells, thus producing the desired reticulated, or highly open, structure. The surfactant also functions to enhance the cleaning power of the finished composition by dispersing greasy dirt when the composition contacts the soiled area. Foam reticulating surfactants are preferably selected from nonionic types which are soluble or dispersible in water.

Preferred nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500-3000 and the polyoxyethylene content is about 35-55% of the molecule by weight, i.e., Pluronic ®L-62.

Other preferred nonionic surfactants include the condensation products of $C_8$-$C_{22}$ alkyl alcohols with 2-50 moles of ethylene oxide per mole of alcohol. Examples of compounds of this type include the condensation products of $C_{11}$-$C_{15}$ fatty alkyl alcohols with about 3-45 moles of ethylene oxide per mole of alcohol which are commercially-available as the Poly-Tergent ®SLF series from Olin Chemicals or the Tergitol ® series from Union Carbide, i.e. Tergitol ®15-S-20, 15-S-12, and 15-S-15, which are formed by condensing a $C_{11}$-$C_{15}$-fatty alcohol mixture with an average of 20, 12 and 15 moles of ethylene oxide, respectively.

Other nonionic surfactants which may be employed include the ethylene oxide esters of $C_6$-$C_{12}$ alkyl phenols such as (nonylphenoxy)polyoxyethylene ether. Particularly useful are the esters prepared by condensing about 8-12 moles of ethylene oxide with nonylphenol, i.e. the Igepal ®CO series (GAF Corp., New York, NY).

Another useful class of nonionic surfactant is the silicone-glycol copolymers. These surfactants are prepared by adding poly(lower)alkylenoxy chains to the free hydroxyl groups of dimethylpolysiloxanols and are available from the Dow Corning Corp. as Dow Corning 190 and 193 surfactants (CTFA name: dimethicone copolyol.) These surfactants function, with the silicone fluids, to control the foaming which can be produced by the other surfactants, and also impart a shine to glazed and metallic surfaces.

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5–50:1.

The total amount of nonionic surfactant which is incorporated into the present foams is preferably about 0.5–20%, most preferably 1–10% by weight of the aqueous phase.

In addition to one or more nonionic surfactants, the foams of the present invention can incorporate an effective amount of one or more anionic surfactants in amounts equal to about 0.5–5% preferably about 1–3% by weight of the aqueous phase.

Amphoteric detergents and cationic detergents may also be incorporated into these hydrophilic foams. These detergents will be employed in a compatible proportion and manner with the nonionic and anionic surfactants, and may comprise about 0.5–10%, preferably 1–5% of the aqueous phase.

Solvent

About 1–20% by weight of the aqueous phase may also consist of an organic solvent such as kerosene, mineral spirits, lower alkanols, paraffin oil, butyl carbitol, alkyl cellusolves or a similar aromatic or aliphatic solvent or solvent mixture, which functions to aid in the solubilization and removal of heavy greasy and oily deposits. Solvents such as m-pyrol and tetrahydrofurfuryl alcohol are preferred for use in foam cleaning compositions intended for use in food service, storage or processing areas.

Minor but effective amounts of an odoriferous or deodorant agent selected so as to be chemically-compatible with the above-described surfactants ar preferably included in the aqueous phase. Useful fragrances will include, for instance about 0.025–2%, preferably about 0.05–1.5% of floral oils such as rose oil, lavender, lilac, jasmine, wisteria, lemon, apple blossom, or compounds bouquets such as spice, pine, aldehydic, woody, oriental, and the like.

Minor amounts of other foam-compatible adjuvants, such as dyes, biocides (preservatives and/or disinfectants) and the like, may be introduced into the present foam products in effective amounts either via the aqueous reactant or resin phase, via the exterior aqueous phase or by treating the final product with the adjuvants as by spraying, mixing, etc. When employed in the present products, such adjuvants can be present at levels of up to about 5–10% by weight of the finished product.

Therefore, useful aqueous reactant phases can comprise about 15–40%, preferably about 20–35% water, 45–65% by weight of abrasive particles which have been surface-treated with about 0.1–5% by weight of the abrasive of a silane-coupling agent, about 1–10% by weight of a nonionic surfactant and of about 1–10% of a silicone fluid, optionally in admixture with about 2–7% of a suspending agent, about 1–15% of an organic solvent and minor amounts of dye and/or fragrance and/or preservative.

Preparation

In a typical procedure, a slurry is formed of water and the abrasive particles which is then treated with the silane-coupling agent with stirring and heating sufficient to surface-coat the abrasive with the silane. The suspending agent is then added portion-wise, followed by the nonionic surfactant, and the silicon fluid. The fragrance, dye and preservative, if any, are then added to the stirred slurry.

The stirred aqueous reactant phase is brought to about 60°–85° F. and blended in the desired weight ratio with the heated (90°–110° F.) prepolymer resin in the mixing chamber of a foam-spraying machine. The foaming, exotherming mixture is sprayed into open or closed forms and allowed to set at ambient temperatures.

The cured foam buns formed by this process are of relatively high density (i.e., about 0.2–0.6 g/cc) but have a much lower tensile strength than is normally desirable or obtained for other polyurethane-type foams. Buns of polyurethane foms which have been formulated so as to retain their integrity as, for example, sponges, abrasive pads, padding and the like typically exhibit tensile strengths of about 30–60 psi as measured by standard ASTM methods (D162372), whereas the foam buns of the present invention have tensile strengths of less than about 10 psi, preferably less than 8 psi, most preferably less than about 2–3 psi. These low tensile strengths permit the buns to be facilely shredded without the expenditure of undue effort and yield shreds which are soft and somewhat self-adhering; properties which are useful to ensure complete coverage of the floor area without undue scattering, and easy pickup of the shreds after they have performed their cleaning function. The preferred shredded foam particle size for the present compositions is about 5–20 mesh most preferably about 6–15 mesh (U.S. Standard Sieve series).

Foam buns as prepared within the above-described parameters yield shreds within a useful free-flow bulk density range of about 0.1–0.6 g/cc, preferably 0.15–0.40 g/cc, as measured by gravity-tapping down a column of freshly prepared shreds three times at ambient temperature. The most dense shreds are prepared when the ratio of aqueous phase to prepolymer resin is at the higher portion of the useful range for any given proportion of abrasive incorporated withn the aqueous phase. Lower ratios of aqueous phase to prepolymer will likewise produce less-dense, fluffier foams. For example, for an aqueous phase incorporating about 50–70% powdered mineral solids as the abrasive, the useful weight ratio of aqueous phase to a Hypol-type prepolymer is about 20:1 to about 1:1, preferably 10-2:1.

To form the finished floor cleaning composition, the shreds are contacted with water, in order to introduce the exterior aqueous phase into the cell voids of the shreds. The water can be absorbed into the shreds by any convenient method, as by spraying or dipping. The exterior aqueous phase can comprise about 5–50% of the weight of the foam shreds, preferably about 10–40%. The exterior, or absorbed aqueous phase can also include minor amounts of liquid cleaning adjuvants such as solvents, surfactants and the like. However, it is highly preferable to incorporate these materials in the interior aqueous phase in order to enhance the ease of preparation of the composition, to control the physical characteristics of the foam and to promote the integrity of the polyurethane foam matrix. Furthermore, solvents, fragrance and other volatile substances which are added in the exterior aqueous phase can be more readily lost by evaporation from the open-celled shreds. Therefore it is normally preferred that as added to the foam shreds, the exterior aqueous phase consists essentially of water.

After introduction of the exterior aqueous phase the finished composition will have a free-flow bulk density of about 0.30 g/cc, preferably about 0.23 g/cc.

When the exterior aqueous phase is employed in these amounts, the resultant foam composition remains substantially free-flowing and is only slightly moist to the touch. When contacted with a greasy or oily non-porous surface and applied thereto under conditions of mild pressure, e.g., by sweeping or buffing, the fom shreds pick up oily soil and coat the surface with a controlled amount of an aqueous cleaning mixture while retaining their structural integrity. The shreds are then removed from the surface and discarded.

The invention will be further described by reference to the following detailed examples.

EXAMPLE I

A reaction kettle equipped with turbine stirring was charged with 75.6 lbs. of water and 180.12 lbs. of powdered F-4 feldspar was added with rapid stirring, followed by slow addition of 0.90 lbs. of n-2-aminoethyl-3-aminopropyltrimethoxysilane (Dow Z-6020). The mixture was heated to 75° F. via external steam heat with continued agitation for 0.6 hr. Wollastonite (NYAD, 18.0 lbs.) was slowly sifted into the slurry, which was then sequentially treated with 15.0 lbs. Tergitol®15-S-15 nonionic surfactant, 15.0 lbs. Dow 200 fluid (50 cps.), 10.3 lbs. tetrahydrofurfuryl alcohol (THFA), 0.72 lb. of Nuosept®95 preservative (Nuodex, Inc., Piscataway, NJ), 0.36 lb. fragrance and 0.30 lb. of yellow dye (Calcium Yellow GP paste). The mixture was stirred for one hour to a rich foam-like consistency. The aqueous reactant phase was heated to 90° F., and combined in a 5:1 ratio with HypolFHP 3000 prepolymer resin (90° F.) in the mixing chamber of a foam-spraying machine. Portions of 4.5 lbs. were sprayed into 17.5"×3.5"×8" polyethylene-lined boxes to form 4.5 lb. buns which set and were de-boxed after 5 minutes. The flexible buns were allowed to cool to room temperature and then were fed into a rotary blade shredder to form 8 and 12 mesh shreds of an open-celled, dense foam.

One hundred gram portions of the 8 and 12 mesh foam shreds were each used to absorb an exterior phase (25 g of water) to afford finished cleaning composition.

The resulting foam shreds were dense, slightly self-adherent and moist to the touch. When shaken onto the quarry tile floor of a restaurant kitchen, which had become slippery with cooking oil, the shreds uniformly cover the surface without undue scattering or bouncing. The particles can be easily taken up by broom sweeping without undue sticking or clumping, and leave a clear, fragrant aqueous film on the flooring which dries without leaving a greasy residue.

Even when incorporating 20% by weight of absorbed water, the 8 and 12 mesh shreds were highly oil-absorbent. In a typical oil absorbance test, 4.0 g of the cleaning composition was mixed with 20 g of Crisco ® vegetable oil and allowed to stand for 2.0 minutes. The oil-foam mixture was poured into a strainer and allowed to drain for 5 minutes. The foam shreds were then re-weighed. According to this test procedure, the cleaning compositions of Example I each absorbed 3.4–3.8 times their weight in oil.

EXAMPLE II

Table I summarizes additional foam clening compositions which were prepared according to the procedure of Example I. The exterior aqueous phase consisted of 20% by weight of the foam shreds of water. Buns prepared without the wollastonite suspending agent or with higher concentrations of tetrahydrofurfuryl alcohol (5–10%) were softer and thus, somewhat more difficult to shred, but also yielded satisfactory cleaning products.

TABLE I

| | Foam Cleaning Compositions | | | |
| | Weight Percent | | | |
| Ingredient | A | B | C | D |
|---|---|---|---|---|
| Hypol ® FHP 3000 | 17.00 | 17.00 | 17.00 | 17.00 |
| Water | 26.60 | 25.00 | 23.00 | 19.10 |
| F-4 Feldspar | 49.20 | 45.50 | 42.50 | 45.30 |
| Wollastonite | — | — | — | 4.50 |
| Dow Z-6020 | 0.24 | 0.22 | 0.21 | 0.22 |
| Dow 200 Fluid | 2.50 | 2.30 | 2.20 | 2.30 |
| THFA | — | 5.00 | 10.00 | 7.50 |
| Nonionic surfactant* | 4.15 | 3.90 | 3.60 | 3.80 |
| Fragrance | 0.10 | 0.10 | 0.10 | 0.10 |
| Preservative** | 0.20 | 0.20 | 0.17 | 0.20 |
| Dye | 0.07 | 0.07 | 0.07 | 0.05 |

*Tergitol ® 15-S-15; 15-S-20 and 1:1 mixtures of 15-S-12/15-S-20 and 15-S-15/15-S-20 were also employed.
**Nuosept ® 95: primary active ingredient is 5-hydroxy-methyl-1-aza-3,7-dioxabicyclo[3.3.0]octane.

The invention has been described with reference to various specific and preferred embodiments and techniques. However, it should be understood that many variations and modifications may be made while remaining within the spirit and scope of the invention.

What is claimed is:

1. A composition for cleaning flooring fouled with oily or greasy soils comprising oil absorbent shreds of a hydrophilic polyurethane foam comprising an open-celled highly reticulated matrix, wherein said matrix incorporates an interior aqueous phase and abrasive particles silane coupled within said matrix and wherein the cells incorporate an absorbed exterior aqueous phase which is partially released from said shreds when the shreds are contacted with the flooring under conditions of pressure wherein in said foam shreds have a particle size of about 5–20 mesh.

2. The composition of claim 1 wherein the interior aqueous phase comprises a nonionic surfactant and a silicone fluid.

3. The composition of claim 2 wherein the nonionic surfactant comprises the condensation product of a $C_8$–$C_{22}$-alkyl alcohol with about 2–50 moles of ethylene oxide.

4. The composition of claim 2 wherein the silicon fluid comprises a polydimethylsiloxane.

5. The composition of claim 1 wherein the interior aqueous phase incorporates an organic solvent.

6. The composition of claim 1 wherein the foam matrix further incorporates particles of an inorganic suspending agent.

7. The composition of claim 1 wherein the exterior aqueous phase consists essentially of water.

8. The composition of claim 7 wherein the exterior aqueous phase comprises about from 2–50% by weight of said foam shreds.

9. The composition of claim 1 wherein said foam shreds are obtained from a dense, friable foam bun having a tensile strength of less than about 8 psi.

10. The composition of claim 1 which has a free flow, bulk density within the range of about 0.1–0.6 g/cc.

11. A method for removing oily or greasy deposits from soiled flooring comprising contacting the surface of the flooring with an effective amount of the composition of claim 1.

* * * * *

UNITED STATES PATENT AND TRADEMARK OFFICE
CERTIFICATE OF CORRECTION

PATENT NO. : 4,551,481
DATED : November 5, 1985
INVENTOR(S) : James A. Smith et al.

It is certified that error appears in the above-identified patent and that said Letters Patent is hereby corrected as shown below:

```
At Column 1, line 55, for "is" read --as--.

At Column 4, line 50, for "tnhus" read --thus--.

At Column 6, line 56, for "Down" read --Dow--.

At Column 7, line 34, for "ar" read --are--.

At Column 8, line 13, for "foms" read --foams--.

At Column 9, line 9, for "fom" read --foam--.

At Column 9, line 65, for "clening" read --cleaning--.
```

Signed and Sealed this

Twenty-fifth Day of March 1986

[SEAL]

Attest:

DONALD J. QUIGG

Attesting Officer

Commissioner of Patents and Trademarks